United States Patent
Choudhary et al.

(10) Patent No.: US 7,421,022 B2
(45) Date of Patent: Sep. 2, 2008

(54) METHOD FOR ROBUST AND STABLE CONVERGENCE OF BLIND LMS BASED ADAPTATION OF COEFFICIENTS FOR A CONTINUOUS TIME FFE-DFE

(75) Inventors: Prashant Choudhary, San Jose, CA (US); Venugopal Balasubramonian, Campbell, CA (US); Jishnu Bhattacharjee, San Jose, CA (US); Debanjan Mukherjee, San Jose, CA (US); Abhijit Phanse, Cupertino, CA (US); Abhijit Shanbhag, Sunnyvale, CA (US); Qian Yu, Santa Clara, CA (US)

(73) Assignee: Inphi Corporation, Westlake Village, CA (US)

( * ) Notice: Subject to any disclaimer, the term of this patent is extended or adjusted under 35 U.S.C. 154(b) by 559 days.

(21) Appl. No.: 11/115,506

(22) Filed: Apr. 27, 2005

(65) Prior Publication Data

US 2006/0245486 A1 Nov. 2, 2006

(51) Int. Cl.
*H03H 7/30* (2006.01)
*H03H 7/40* (2006.01)
*H03K 5/159* (2006.01)

(52) U.S. Cl. .................. 375/233; 375/232; 375/230; 375/231; 708/322; 708/323

(58) Field of Classification Search ............. 375/229, 375/230, 231, 232, 233, 234, 348, 350; 708/322, 708/323
See application file for complete search history.

(56) References Cited

U.S. PATENT DOCUMENTS

| | | | | |
|---|---|---|---|---|
| 4,483,009 A | * | 11/1984 | Honda et al. | 375/232 |
| 5,159,565 A | * | 10/1992 | Bune | 708/319 |
| 5,539,774 A | | 7/1996 | Nobakht et al. | |
| 6,009,120 A | | 12/1999 | Nobakht | |
| 2003/0189996 A1 | | 10/2003 | Shanbhag | |
| 2005/0053127 A1 | * | 3/2005 | Shiue et al. | 375/232 |
| 2005/0181741 A1 | * | 8/2005 | Raj et al. | 455/73 |
| 2006/0083296 A1 | * | 4/2006 | Bhattacharjee et al. | 375/232 |

* cited by examiner

*Primary Examiner*—Phuong Phu
(74) *Attorney, Agent, or Firm*—Alan H. MacPherson; MacPherson Kwok Chen & Heid LLP

(57) ABSTRACT

A continuous time electronic dispersion compensation architecture using feed forward equalization and a non-linear decision feedback equalization forms an output signal by a linear combination of successively delayed versions of the input signal and the sliced output signal weighted by appropriate coefficients. A selected number of taps in the mixer used to generate a corresponding number of coefficients for use in the feed forward equalizer are held to a selected voltage to ensure that the coefficients associated with these two taps do not drift. This causes the other coefficients to converge to a unique minimum square error value. In one embodiment the selected voltage is the maximum system voltage.

21 Claims, 2 Drawing Sheets

METHOD FOR ROBUST AND STABLE CONVERGENCE OF BLIND LMS BASED ADAPTATION OF COEFFICIENTS FOR A CONTINUOUS TIME FFE-DFE

FIELD OF THE INVENTION

This invention relates to digital signal processing and in particular to a digital signal processing system related to the adaptation of coefficients in a blind least mean square (LMS) system including a continuous time feed forward equalizer and a decision feedback equalizer.

BACKGROUND OF THE INVENTION

Systems for adaptive equalization of one or more physical channels transmitting a plurality of symbols are well known. See for example, U.S. Pat. No. 6,009,120, issued Dec. 28, 1999, on an application of Nobakht and U.S. Pat. No. 5,539,774, issued Jul. 23, 1996 on an application of Nobakht et al. The Nobakht '120 patent discusses the then prior art involving pulse amplitude modulation wherein all channels tend to introduce noise as well as amplitude and phase distortion that broadens the pulses and causes inter-symbol interference ("ISI"). Two types of interference are discussed, namely, precursor ISI, which is distortion that leads a particular pulse and thus interferes with past pulses and post-cursor ISI, namely, distortion that follows a particular pulse and thus interferes with future pulses. As described in the '120 patent, non-linear equalization, such as decision feedback equalization ("DFE"), was conventionally used to eliminate post-cursor ISI from a given symbol. The '120 patent is directed to a system for equalizing one or more physical channels transmitting a plurality of electrical signals corresponding to a plurality of interdependent symbols according to a multi-dimensional code, wherein a minimum decodable number of symbols is transmitted over more than one symbol interval. ('120 patent, col. 2, lns. 45-52). The '120 patent thus relates to what are sometimes called "interdependent symbols" ('120 patent, col. 4, ln. 15). Equalizers to compensate for the channel distortion on a received pulse are described, for example, in the Nobahkt et al. '774 patent. The '774 patent describes both linear and non-linear equalizers and both "trained" and "blind" equalizers. Nobakht, in the '120 patent, describes the '774 patent as directed to a "signal channel transmitting a sequence of symbols that are sliced and decoded in a strict symbol coded by symbol sequence" ('120 patent, Col. 2, lns. 7 to 10).

The '774 patent proposes using a "trainer" system which communicates with a "trainee" system. On the other hand, the '120 patent is associated with a coded scheme which encodes a plurality of data bits into a multidimensional constellation of data symbols that provides redundancy, gain and noise immunity.

What is desired is an adaptive system which is capable of providing continuous time adaptation without training, and which operates generally, and not just with a multidimensional code utilizing interdependent symbols.

SUMMARY OF THE INVENTION

In accordance with this invention, a continuous time electronic dispersion compensation ("EDC") circuit using feed forward equalization ("FFE") and non-linear decision feedback equalization ("DFE") is provided in which the output signal from the electronic dispersion compensation circuitry is formed by a combination of successively delayed versions of the input signal and the sliced output signal weighted by appropriate valued coefficients (called FFE and DFE coefficients).

In accordance with this invention, a selected number of taps used to generate coefficients are fixed to a unique voltage. In one embodiment, the unique voltage has a positive maximum value denoted as +1. In other embodiments a selected voltage strong enough to hold the system coefficients to stable values is used. The number of taps held to a unique voltage can vary depending on the system using the EDC circuit. This insures that the coefficients associated with the taps carrying the selected voltage do not drift and causes the other coefficients to converge to a unique minimum mean square error ("MMSE") value.

In another embodiment two taps are held to a selected voltage. Once the corresponding two coefficients are generated using the selected voltages on these two taps, this selected voltage can be varied to optimize the system performance as a function of the particular system in which the circuitry is to be used. Typically, the specific voltages of the two coefficients will affect the shape of the signal waveform. By varying the particular voltages of these two coefficients and observing the resulting waveform shape, the optimum voltage for these coefficients can be obtained as a function of the particular system in which the circuitry is to be used.

In addition, although two taps are used in this embodiment of the invention to carry a fixed voltage, if desired, a different number of taps can be used such as a single tap or three or more taps to carry one or more fixed voltages. The number of taps to be used is a function of the tap spacing as it relates to the width of the symbol, the gain of the closed loop feedback circuitry and the adaptation time constant of the feedback circuitry. The optimum configuration can be determined empirically by running different voltages on different numbers of taps and observing the output waveform. Accordingly, the invention is flexible in its application and gives a degree of stability to the resulting signal waveform which is desired in electronic dispersion compensation circuitry.

In accordance with another embodiment of this invention, a bias of +1 (the maximum positive voltage) is added to two selected adjacent taps but the error mixers are connected to the tap mixers with a very low adaptation gain on the error mixers. This insures that the coefficients drift only around a small region and thus converge to a unique solution for most channels.

This invention will be more fully understood in conjunction with the following detailed description taken together with the attached drawings.

DETAILED DESCRIPTION

While this invention will be illustrated with circuitry wherein the voltages on two taps in the error mixer used to generate coefficients $C_0$ to $C_N$ are fixed, this invention can fix the voltages on three or more taps or on one tap or on a number of taps between one and N−1, where N+1 is the total number of taps in the error mixer.

Figure 1:
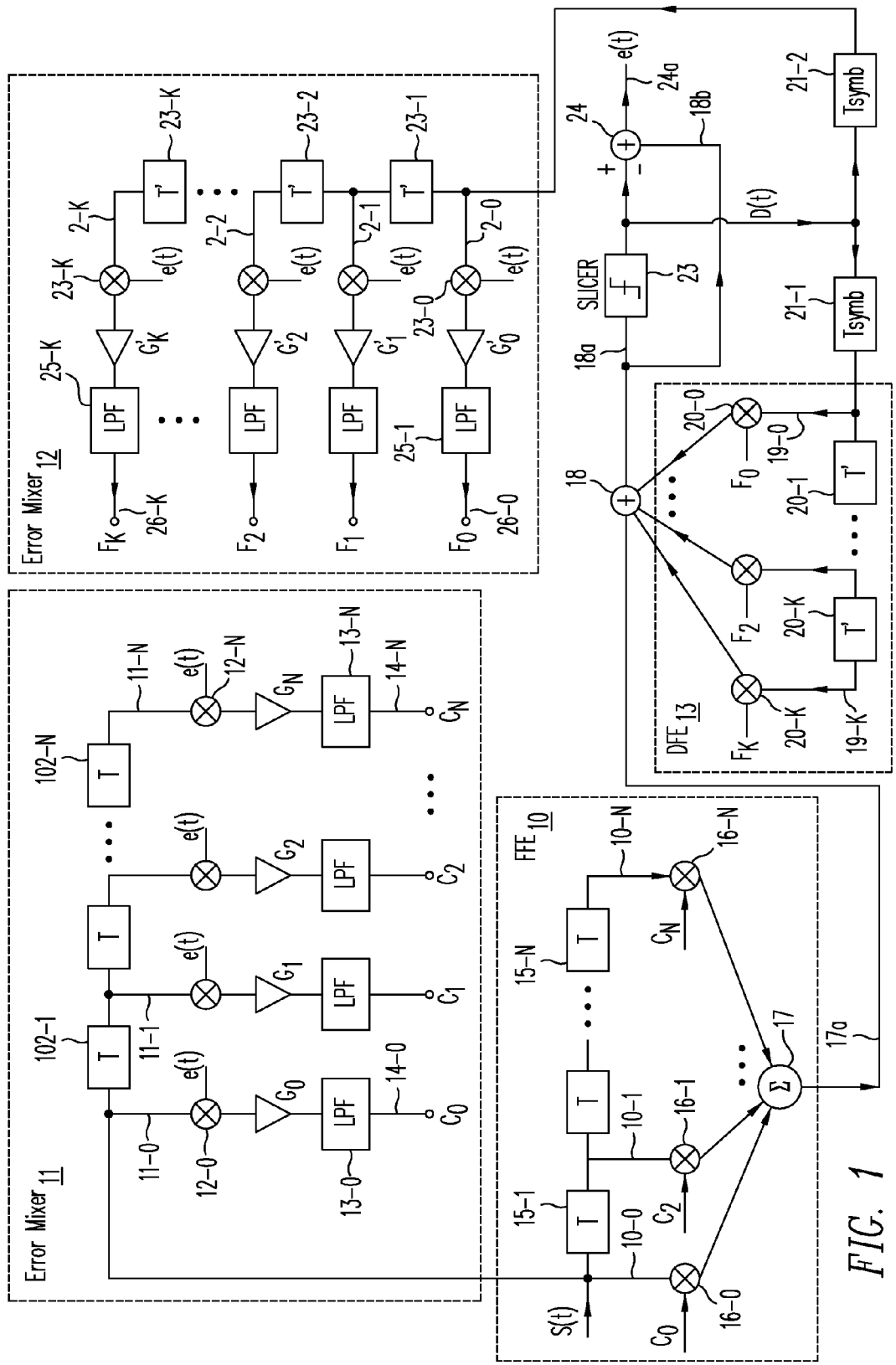
FIG. 1 shows circuitry for processing an incoming signal in accordance with one embodiment of this invention to remove inter-symbol interference.

In FIG. 1, an input signal S(t) is received by the system of this invention and is processed to provide an output signal $V_{out}(t)$ which has been processed to remove the effects of inter-symbol interference to the extent that this is possible.

Thus, the output signal $V_{out}(t)$ is defined by equation (1) as:

$$V_{out}(t) = \sum_i C_i S(t-iT) + \sum_k F_k \cdot D(t-kT' - T_{symb}) \quad (1)$$

In equation 1, $C_i$ are feed forward equalization (FFE) coefficients and $F_k$ are feedback coefficients. S(t) is the input signal and D(t) is the sliced output signal. "T" represents the delay introduced by delay elements 102-1 through 102-N (FIG. 1) and thus, is the delay between each of the FFE taps 11-0 through 11-N as shown in FIG. 1. "T'" is the delay associated between each of the DFE taps 2-0, 2-1, 2-2 through 2-K, FIG. 1. $T_{symb}$ is one symbol delay (i.e. the period of one symbol). Each symbol corresponds to one bit of data.

For computing the coefficients $C_i$, decision directed continuous time least means squared ("LMS") adaptation is used where the mean squared value of the error signal e(t), as defined in equation 2 below, is minimized.

$$e(t) = D(t) - V_{out}(t) \quad (2)$$

The coefficients $C_i$ which minimize the mean squared error signal e(t) are computed by applying the orthogonality principle for linear minimum mean square error ("MMSE") estimation as follows in equation 3.

$$C_i = G_i \operatorname{mean}[e(t) \cdot S(t-iT)] \quad (3)$$

In equation 3, $G_i$ is the gain for the ith coefficient $C_i$.

The coefficients $F_k$ used in FIG. 1 are calculated from Equation 4.

$$F_k = G_k \operatorname{mean}[e(t) \cdot D(t-kT - T_{symb})] \quad (4)$$

In equation 4, $G_k$ is the adaptation loop gain for the kth coefficient $F_k$. In actual analog implementation of equations 1 through 4, the timings of the different signals involved cannot be perfectly matched. As a consequence of timing mismatches the following phenomena are observed:

1. Even if coefficients $C_0 \ldots C_k$ are initialized with optimum values, the FFE coefficients drift to non-optimal values in the presence of timing mismatches.
0. In the presence of some perturbations in the signals, the coefficients can switch polarity resulting in an equalized but negative signal at the output terminal of the electronic dispersion compensation circuitry ("EDC").
0. Higher adaptation loop gains are required for converging to an optimal MMSE solution, but higher gains also make the adaptation more sensitive to timing mismatches.

Figure 2:
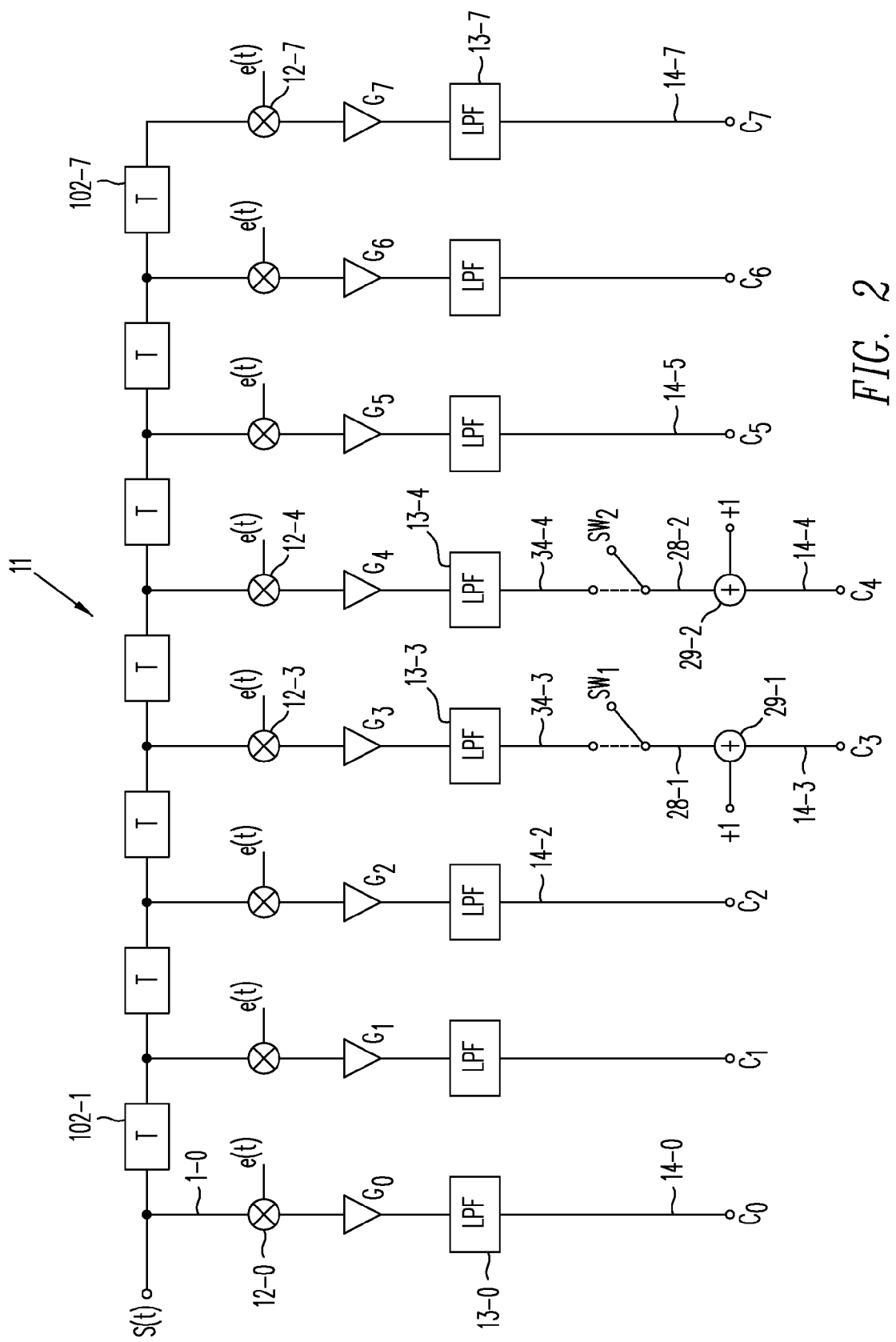
FIG. 2 shows a unique construction of the circuitry in accordance with another embodiment of this invention for processing the delayed versions of the incoming signal to generate the coefficients required to optimally process the incoming signal to remove inter-symbol interference and to achieve the minimum mean square error in the output signal.

To ensure stable and robust convergence to the optimal MMSE solution in the presence of timing mismatches and higher adaptation gains, the following approaches have been used. Referring to FIG. 2, in the embodiment shown, the center two taps 14-3 and 14-4 of the error mixer 11 are fixed to +1, the positive maximum voltage (in one embodiment about 350 millivolts) to which these taps can be fixed. This prevents any drifting of the coefficients from the two taps 14-3 and 14-4, and as a result, the other coefficients C0, C1, C2, C5, C6 and C7 converge to a unique minimum mean squared error solution. Thus, the constraint of the two center taps 14-3 and 14-4 fixed to +1 forces the coefficients C0, C1, C2, C5, C6 and C7 to converge in a unique manner. As shown in FIG. 2, in this embodiment the error mixers 12-3 and 12-4 are disconnected from the tap mixers 29-1 and 29-2 via switches SW1 and SW2 (both shown as open). The center two error mixers 12-3 and 12-4 in this open loop mode and low adaptation gain are used to fine tune the front end automatic gain control ("AGC") gain. To do this, an AGC circuit (not shown) is provided to control the magnitude of the signal S(t). The output signals on leads 34-3 and 34-4 from low pass filters 13-3 and 13-4 are measured and the larger of these two output signals is then monitored as the gain of the AGC circuit is varied. The AGC gain is adjusted until the larger output voltage from leads 34-3 and 34-4 is close to zero or slightly negative (about −20 millivolts). The AGC gain which achieves this result has been found to give the optimum value for the signal e(t).

Should the maximum output voltage on leads 34-3 and 34-4 switch between these two leads as the gain of the AGC circuit is changed, then the maximum voltage on either lead 34-3 and 34-4 is monitored until the gain of the AGC circuit is adjusted to cause this output voltage to fall between zero and −20 millivolts.

A second embodiment closes switches SW1 and SW2 (shown by dashed lines in FIG. 2) and biases the two center taps 14-3 and 14-4 to +1 with very low adaptation gain for amplifiers $G_3$ and $G_4$. A typical gain for these amplifiers is approximately 4 to 5 in one embodiment. Other gains will be appropriate in other embodiments. As shown in FIG. 2, a bias of +1 is still added to the tap mixers 29-1 and 29-2, respectively, but the output signals from the error mixers 12-3 and 12-4 are transmitted to the input leads of the tap mixers 29-1 and 29-2 with switches SW1 and SW2 closed as shown by the dashed lines in FIG. 2. Very low adaptation gain on the output signals from error mixers 12-3 and 12-4 insures that the coefficients $C_0$ to $C_7$ drift only around a small region around the center. For most channels the coefficients will converge to a unique solution.

While center taps 14-3 and 14-4 are shown as being selected to have the coefficients $C_3$ and $C_4$ on these taps driven to the system voltage +1, center taps 14-4 and 14-5 could equally be selected for this purpose as well as center taps 14-2 and 14-3. In these circumstances, the tap mixers 29-1, 29-2 would be associated with the two center taps selected to receive the maximum voltage. Experiments have shown that use of any of these pairs of center taps assures that the coefficients $C_0$ through $C_7$ will converge to a unique solution.

Alternative embodiments of the invention can use more than eight coefficients. In those circumstances, a pair of center taps approximately centered in the middle of the range of coefficients and biased to the maximum system voltage will cause the other coefficients again to converge to a unique solution. For example, if 12 coefficients are used then the center taps 6 and 7 or 7 and 8 or 5 and 6 could be used and biased to the maximum system voltage in accordance with this invention. If other numbers of coefficients are to be generated then the pair of center taps to be biased to the maximum system voltage in accordance with this invention can again be selected to be approximately in the center of the range of center taps.

FIG. 1 shows in greater detail a system utilizing the coefficient $C_0$ through $C_7$ generated by the error mixer 11 in accordance with this invention. The signals representing the output coefficients $C_0$ through $C_N$ on leads 14-0 through 14-N are input to tap mixers 16-0 through 16-N in the feed forward equalizer 10 shown in FIG. 1. Delays 15-1 through 15-N of T seconds each (typically nanoseconds but any appropriate selected value) have attached to their output leads taps 10-1 through 10-N which carry delayed versions of the input signal S(t). The signal S(t) and delayed versions of S(t) are thus provided on leads 10-0 through 10-N to corresponding input leads of tap mixers 16-0 through 16-N where the signal S(t) and delayed versions thereof are multiplied by signals representing the coefficients $C_0$ through $C_N$. The output signals from mixers 16-0 through 16-N are summed in summation network 17 and the summation output signal from network 17 is transmitted on lead 17a to adder 18. In adder 18, the output signal from summation network 17 is added to the output signals from mixers 20-0 to 20-K in decision feedback equalizer 13. These output signals represent the weighted corrected feedback signals which are generated from the output signal D(t) from slicer 23 which is passed through symbol delay 21-1 (this delay provides a delay of one period of the symbol contained in signal S(t)). Delays 20-1 through 20-K each provide an additional delay T' to the signal D(t). The output signals from these delays are transmitted on leads 19-0 through 19-K to mixers 20-0 through 20-K where these output signals are multiplied by the signals representing coefficients $F_0$ to $F_K$. Signals representing coefficients $F_0$ to $F_K$ are generated in error mixer 12 using delayed versions of the signal D(t). Signals from mixers 20-0 through 20-K are input to adder 18 to generate with the output signal from summation network 17, an output signal from adder 18 which is transmitted on lead 18a to slicer 23 and on lead 18b to subtracting network 24. The subtracting network 24 generates the error signal e(t) on lead 24a by subtracting the output signal from adder 18 from the output signal D(t) from slicer 23. The resulting error signal e(t) is then used in error mixers 11 and 12 to generate the coefficients $C_0$ through $C_N$ and $F_0$ through $F_K$ which then are used to process the signal S(t) to provide the output signal D(t) containing useful information.

The circuitry of this invention is particularly adapted for use in conjunction with the circuitry disclosed in patent application Ser. No. 10/117,293, filed Apr. 5, 2002, and assigned to Scintera Networks, Inc., the assignee of this invention. This application, entitled "Compensation Circuit For Reducing Intersymbol Interference Products Caused by Signal Transmission Via Dispersive Media", is incorporated herein by reference in its entirety.

While embodiments of this invention have been disclosed, other embodiments of this invention will be obvious to those skilled in the art in view of this disclosure. Accordingly, this invention is limited only by the following claims.

What is claimed is:

1. An error mixer for an electronic dispersion compensation system including a feed forward equalizer for producing delayed output signals, and a decision feedback equalizer, said error mixer comprising:

a plurality of N series-connected delay circuits for delaying the input signal S(t) a selected number of times, where N is a selected integer;

a plurality of N+1 taps connected to carry said input signal S(t) and to carry N delayed versions of S(t), each tap except the last being separated from the next following tap by one of said N series-connected delay circuits;

a plurality of N+1 multipliers connected to receive S(t) and said N delayed versions of S(t) for multiplying the value of the input signal S(t) from the input terminal and the delayed versions of S(t) from each of the N+1 taps by the value of an error signal e(t) to produce thereby a plurality of N+1 output signals;

a plurality of N+1 amplifiers connected to amplify the N+1 output signals produced by the N+1 multipliers;

a plurality of N+1 low-pass filters connected to receive and filter the N+1 output signals from the N+1 amplifiers to produce a plurality of N+1 filtered output signals;

a plurality of N+1 output leads from the N+1 low-pass filters for transmitting said plurality of N+1 filtered output signals, each filtered output signal representing a coefficient $C_i$ to be used to multiply and weight corresponding delayed output signals from the feed forward equalizer to provide an output signal D(t) for use in generating the error signal e(t);

a selected number of adders, each adder having at least two input leads, and an output lead;

a switch corresponding to each adder, each switch having an input lead and an output lead, the input lead of each switch being connected to an output lead from a corresponding one of said low pass filters, the output lead from each switch being connected to one input lead of a corresponding one of said selected number of adders; and a voltage source connected to a second input lead of each of said selected number of adders for causing the output signal from the output lead of each of said selected number of adders to assume a selected value.

2. Structure as in claim 1 wherein said selected number of adders is less than N+1.

3. Structure as in claim 2 wherein said selected number of adders is one.

4. Structure as in claim 2 wherein said selected number of adders is two.

5. Structure as in claim 1 wherein said selected number of adders is at least one.

6. Structure as in claim 1 wherein said selected number of adders is at least two.

7. Structure as in claim 1 wherein said selected number of adders is at least three.

8. Structure as in claim 1 wherein said selected value is the maximum voltage provided by the system.

9. Structure as in claim 8 wherein said each of said switches is disconnected from the output lead on the corresponding low pass filters, and further wherein each of said selected number of adders comprises a summing circuit, each summing circuit providing a corresponding output signal, each summing circuit having a first input lead connected to a corresponding switch and a second input lead connected to a source of said maximum voltage, wherein the output voltage from said summing circuit comprises the value of the coefficient corresponding to said corresponding low pass filter.

10. Structure as in claim 1 wherein each of said switches is closed, thereby connecting one input lead from the corresponding adder to the output terminal from the corresponding low pass filter, and wherein said amplifier corresponding to said low pass filter has low gain.

11. An error mixer for generating a plurality of coefficients $C_0$-$C_N$, where N is a selected integer, for use in an electronic dispersion compensation system, wherein said error mixer comprises:

a plurality of N+1 circuits, the first of said circuits for receiving the input signal S(t) and each of said other circuits for receiving a corresponding uniquely delayed version of said input signal S(t); and a selected number of adders for connection to the output leads of a corresponding number of said circuits, each of said adders having a first input lead for connection to an output lead from a corresponding one of said circuits, and a second input lead for connection to receive a selected input voltage, and an output lead for transmitting a voltage corresponding to a selected value of the corresponding coefficient $C_n$.

12. Structure as in claim 11 including a switch between the first input lead of each of said adders and the corresponding output lead from the corresponding circuit.

13. Structure as in claim 12 wherein each of said selected number of adders is connected so as to provide a selected output signal from said error mixer.

14. Structure as in claim 13 wherein said selected output signal represents a selected coefficient to be provided by said mixer for use in said electronic dispersion compensation circuit.

15. Structure as in claim 14 wherein said selected value is the maximum selected voltage of the system.

16. Structure as in claim 11 wherein said selected number of adders is between 1 and N−1.

17. Structure as in claim 16 wherein said selected number of adders is at least two.

18. A method of generating coefficients for use in a feed forward equalizer associated with an electronic dispersion compensation system which comprises:

generating a plurality of coefficients for use in the feed forward equalizer by:

passing an input signal through a plurality of series-connected delays to generate a plurality of delayed input signals;

using the input signal and each of said delayed input signals together with an error signal to generate a corresponding number of intermediate coefficient signals;

passing each of said intermediate coefficient signals through a corresponding amplifier with a selected gain to generate a corresponding number of coefficient signals;

passing each of said coefficient signals through a low-pass filter to generate said coefficients; and causing a selected number of said coefficients to be held at a selected voltage.

19. The method of claim 18 wherein said selected voltage is the maximum system voltage.

20. The method of claim 18 wherein said selected number is at least one.

21. The method of claim 20 wherein said selected number is at least two.

* * * * *